Oct. 27, 1953
M. C. KINCAIDE
2,657,103
BEARING FOR DISK TOOLS
Filed March 25, 1950
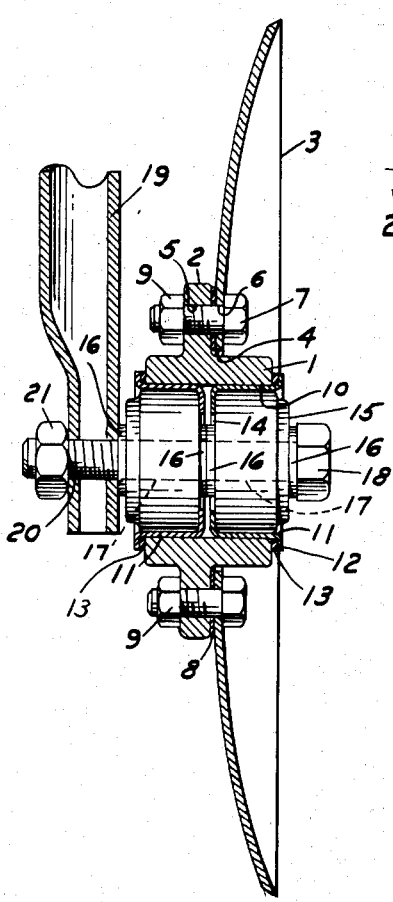
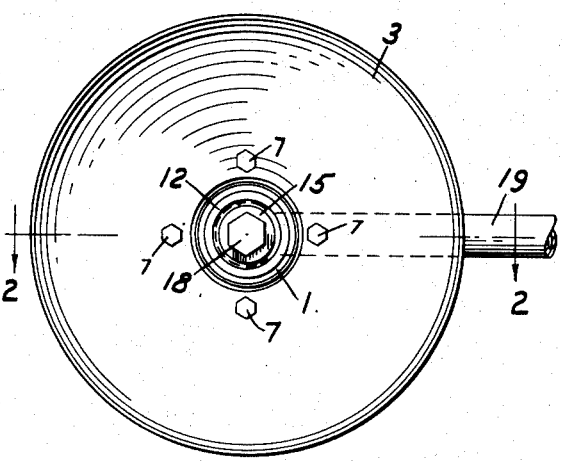
INVENTOR.
MERRILL C. KINCAIDE Patented Oct. 27, 1953

2,657,103

UNITED STATES PATENT OFFICE 2,657,103

BEARING FOR DISK TOOLS

Merrill C. Kincaide, Detroit, Mich., assignor to Dearborn Motors Corporation, Highland Park, Mich., a corporation of Delaware Application March 25, 1950, Serial No. 151,939

1 Claim. (Cl. 308—181)

This invention relates to an improved bearing and support for rotatably mounting disc type earth working tools on a tool bar.

Disc type earth working tools are commonly used in the tillage of soil, for hilling of crops, and for covering seed furrows as tools of this type are relatively inexpensive to manufacture and retain their useful life after a long period of usage where other types of tools are quickly worn requiring frequent replacement. Many types of earth working implements employing disc type tools, however, have one common disadvantage and that is the difficulty of providing an adequate dirt sealed bearing for rotatably supporting such discs which will not be subject to bearing failure.

Accordingly, it is an object of this invention to provide an improved bearing support for rotatably mounting a disc on a supporting tool bar.

Another object of this invention is to provide an improved bearing for the discs of disc type earth working tools which is permanently lubricated and positively sealed against the entrance of extraneous matter.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is an elevational view of a disc type earth working tool shown mounted on a support bar.

Figure 2 is an enlarged sectional view taken along the plane 2—2 of Figure 1.

As shown on the drawings:

The improved bearing of this invention is shown embodied in the mounting of a disc on a tool used primarily for hilling crops. A cylindrical hub 1 having an exterior annular, radial flange 2 disposed substantially centrally of hub 1 is provided for mounting a dish shaped disc 3 thereon. Disc 3 is provided with an axial hole 4 which fits over hub 1 and such disc lies adjacent annular flange 2. A plurality of transverse holes 5 are provided in angularly spaced relationship about flange 2 and a corresponding number of holes 6 are provided in disc 3 which align with holes 5 to permit the insertion of a bolt 7 in each of such aligned holes whereby disc 3 is secured to flange 2. A washer 8 is preferably placed between disc 3 and flange 2 at each set of aligned holes 5 and 6 and is there positioned by the bolt 7. A nut 9 on each bolt 7 secures such bolt to flange 2.

Hub 1 has an axial bore 10 to receive a pair of bearing receiving cups 11. Each cup 11 is provided with an end flange 12 radially disposed to the body portion of such cup and a ring 13 of suitable gasket material surrounds the body portion of cup 11 adjacent the inner face of flange 12, thus when cup 11 is forced into bore 10, the ring 13 of gasket material will lie between the outer face of hub 1 and flange 12. An axial aperture 14 is provided in the bottom of each cup 11 for a purpose that will presently appear.

A ball bearing unit 15 is press fitted into each cup 11 as shown in Figure 2. Bearing unit 15 is of well known construction, being provided with a ball bearing race (not shown) having a permanent type of lubricant contained therein. The exterior face of each bearing unit 15 is permanently sealed to prevent dirt entering the bearing. However, the interior faces of such conventional bearings are not dirt sealed. Each bearing 15 has an axial hub portion 16 projecting slightly beyond the inner face of each of such bearings and when such bearings are assembled within cups 11, the inwardly facing hubs 16 are in intimate contact as shown in Figure 2. Gaskets 13 thus substantially eliminate all possibility of the entrance of water or dirt into bearings 15 by excluding such matter from the unsealed side of each bearing unit 15.

Each bearing 15 is provided with an axial bore 17 in which a bolt 18 is inserted. The threaded end of bolt 18 is then insertable in a transverse hole 20 provided near the bottom end of a vertically disposed tool standard 19 which is secured in depending relationship to the implement frame (not shown). A nut 21 screwed on to the threaded end of bolt 18 and tightened against the adjacent surface of standard 19 secures such bolt in a horizontal position and thus rotatably mounts disc 3 on tool standard 19.

From the above description it will appear that there is here provided a simple rugged bearing support design for disc type earth working tools which may be economically manufactured since it utilizes commercially available ball bearing units. With this improved bearing construction, the bearing units have the lubricant sealed in and dirt sealed out for the life of the bearing, thereby providing a trouble-free mounting for disc type earth working tools requiring but a minimum of upkeep.

It will, of course, be understood that various details of construction may be varied through a wide range without departing from the principles of this invention and it is, therefore, not the purpose to limit the patent granted hereon otherwise than necessitated by the scope of the appended claim.

I claim:

In an implement having a tool support bar, a disc support comprising a cylindrical hub having an axial bore and opposed outer radial faces, a disc shaft projecting axially into said hub bore for disposing the hub on said bar, axially aligned bearing units interposed in said bore between said hub and said shaft with the axially inner bearing faces in intimate contact with one another within said bore and having their axially outwardly directed opposing faces dirt-sealed, a pair of inwardly dished cups of relatively thin cross-section, each of said cups having an intermediate axially extending portion press-fitted between and in direct intimate contact with the exterior of one of said bearing units and the inner wall of said hub respectively, said cups having centrally apertured radially directed inner flanges interposed between said bearing units terminating in closely spaced relation to the contacting inner faces of said bearing units to receive said shaft therethrough and terminal radially outwardly directed flanges overlying the associated radial face of said hub, an annular seal ring interposed between each of said outwardly directed flanges and the adjacent radial face of said hub, and clamping means on said shaft acting on said bearing units to urge the same toward one another, thereby retaining the inner faces of said bearing units in intimate contact and said seal rings in snug contact with the respective hub radial faces, whereby the inner faces of said bearings are dirt-sealed by the multiple sealing effects of said seal rings, the press-fit of said cups between said hub and bearing units, said cup inner flanges, and the contacting bearing inner faces.

MERRILL C. KINCAIDE.

References Cited in the file of this patent

UNITED STATES PATENTS

| Number | Name | Date |
|---|---|---|
| 1,278,060 | Swenson | Sept. 3, 1918 |
| 1,407,568 | Page | Feb. 21, 1922 |
| 1,749,281 | Hambleton | Mar. 4, 1930 |
| 1,856,547 | Gotthardt | May 3, 1932 |
| 1,979,388 | House | Nov. 6, 1934 |

FOREIGN PATENTS

| Number | Country | Date |
|---|---|---|
| 577,491 | Germany | May 31, 1933 |